United States Patent
Recchia et al.

(10) Patent No.: US 12,280,916 B2
(45) Date of Patent: Apr. 22, 2025

(54) MULTIWALL PAPER PACKAGING STRUCTURES

(71) Applicant: PROAMPAC HOLDINGS INC., Cincinnati, OH (US)

(72) Inventors: Raymond J. Recchia, Cincinnati, OH (US); Russell A. Leeker, Fenton, MO (US); Brian J. Schiermeier, White House, TN (US); Seyed Hesamoddin Tabatabaei, Mason, OH (US); Robert M. Tiepelman, Cottontown, TN (US); Daniel T. Senter, Crestwood, MO (US)

(73) Assignee: ProAmpac Holdings Inc., Cincinnati, OH (US)

( * ) Notice: Subject to any disclaimer, the term of this patent is extended or adjusted under 35 U.S.C. 154(b) by 102 days.

(21) Appl. No.: 17/953,647

(22) Filed: Sep. 27, 2022

(65) Prior Publication Data

US 2023/0099868 A1   Mar. 30, 2023

Related U.S. Application Data

(60) Provisional application No. 63/248,753, filed on Sep. 27, 2021.

(51) Int. Cl.
*B65D 30/08* (2006.01)
*B32B 7/14* (2006.01)
(Continued)

(52) U.S. Cl.
CPC .............. *B65D 31/02* (2013.01); *B32B 7/14* (2013.01); *B32B 29/005* (2013.01); *B32B 29/06* (2013.01);
(Continued)

(58) Field of Classification Search
CPC .......... B65D 31/02; B65D 31/10; B32B 7/14; B32B 29/005; B32B 29/06;
(Continued)

(56) References Cited

U.S. PATENT DOCUMENTS 2,157,392 A * 5/1939 Williams .............. B65D 31/02
383/98
4,609,571 A   9/1986 Tytke
(Continued)

FOREIGN PATENT DOCUMENTS

EP          0545228 A1 *  6/1993
JP       2001270014 A    10/2001
(Continued)

OTHER PUBLICATIONS

English machine translation of JP 2001270014 A (2001).
(Continued)

*Primary Examiner* — Jes F Pascua
(74) *Attorney, Agent, or Firm* — McLane Middleton, Professional Association

(57) ABSTRACT

A packaging article includes an outer, intermediate, and inner paper plies. A first adhesive layer is disposed between the inner and intermediate paper plies for gluing the inner paper ply to the intermediate paper ply. A second adhesive layer is disposed between the intermediate and outer paper plies for gluing the intermediate paper ply to the outer paper ply. The first and second adhesive layers overlap and are coaligned. The outer, intermediate, and inner paper plies are adjoined to form a multiwall structure, wherein the first adhesive layer and the second adhesive layer are coaligned with each other on the multiwall structure. The first adhesive layer comprises a first plurality of adhesive spots and the second adhesive layer comprises a second plurality of adhesive spots, wherein the adhesive spots of the first plurality of (Continued)

adhesive spots do not overlap with the adhesive spots of the second plurality of adhesive spots.

25 Claims, 4 Drawing Sheets

(51) Int. Cl.
  *B32B 29/00* (2006.01)
  *B32B 29/06* (2006.01)
  *B32B 37/12* (2006.01)
  *B65D 30/20* (2006.01)

(52) U.S. Cl.
  CPC .......... *B32B 37/1292* (2013.01); *B65D 31/10* (2013.01); *B32B 2250/03* (2013.01); *B32B 2250/26* (2013.01); *B32B 2255/12* (2013.01); *B32B 2255/28* (2013.01); *B32B 2307/4023* (2013.01); *B32B 2307/7265* (2013.01); *B32B 2317/12* (2013.01); *B32B 2439/06* (2013.01); *B32B 2439/70* (2013.01)

(58) Field of Classification Search
  CPC ............ B32B 37/1292; B32B 2250/03; B32B 2250/26; B32B 2255/12; B32B 2255/28; B32B 2307/4023; B32B 2307/7265; B32B 2317/12; B32B 2439/06; B32B 2439/70
  USPC .......................................... 383/101, 109, 113
  See application file for complete search history.

(56) References Cited

U.S. PATENT DOCUMENTS

| | | | | |
|---|---|---|---|---|
| 5,344,016 | A | * | 9/1994 | Weder ..................... B65B 25/02 229/87.01 |
| 5,553,943 | A | * | 9/1996 | Cook ..................... B65D 31/08 383/126 |
| 5,588,530 | A | * | 12/1996 | Weder ................... B31F 1/0045 229/87.01 |
| 5,941,451 | A | * | 8/1999 | Dexter ................... B42D 15/08 229/92.1 |
| 6,500,293 | B1 | * | 12/2002 | Dexter ................... B42D 15/08 229/92.1 |
| 6,627,033 | B1 | * | 9/2003 | Dexter ................... B42D 15/08 156/271 |
| 2006/0045392 | A1 | * | 3/2006 | Bannister ............... B65D 33/01 383/102 |
| 2024/0132252 | A1 | * | 4/2024 | Recchia ................. B32B 27/10 |
| 2024/0228118 | A9 | * | 7/2024 | Recchia ................. B65D 31/10 |

FOREIGN PATENT DOCUMENTS

| | | |
|---|---|---|
| KR | 102079077 B1 | 2/2020 |
| WO | 200061456 A1 | 10/2000 |
| WO | 2017017856 A1 | 2/2017 |

OTHER PUBLICATIONS

English machine translation of KR 102079077 B1 (2020).
English machine translation of WO 2017/017856 A1 (2017).
International Search Report and Written Opinion dated Jan. 26, 2023 received in PCT/US2022/044844.

* cited by examiner

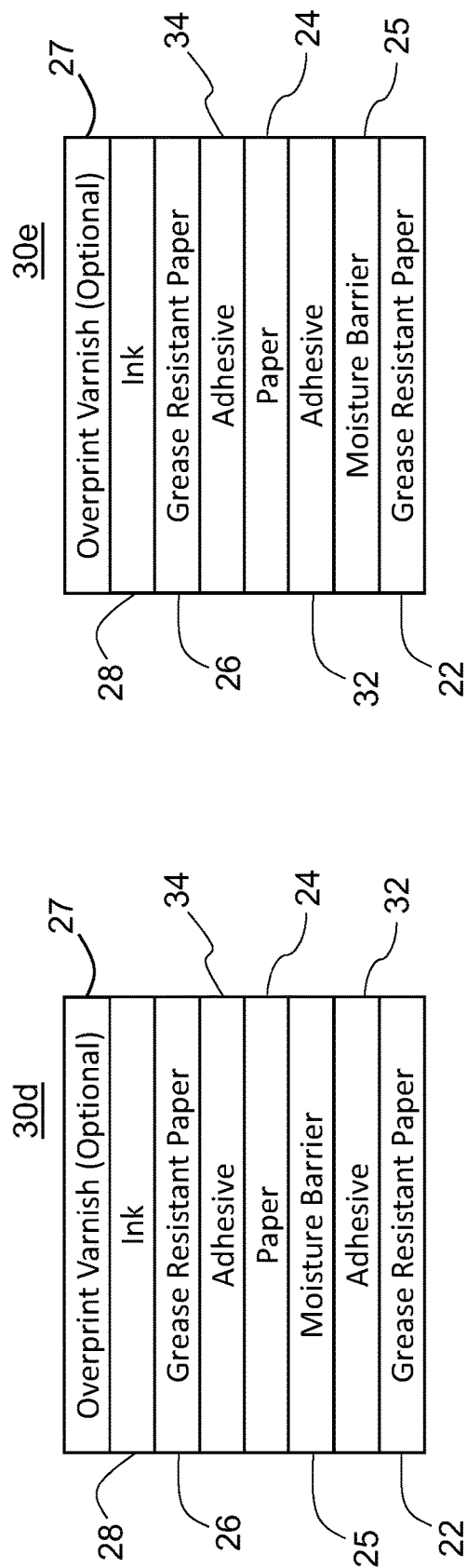
FIG. 3D
FIG. 3E
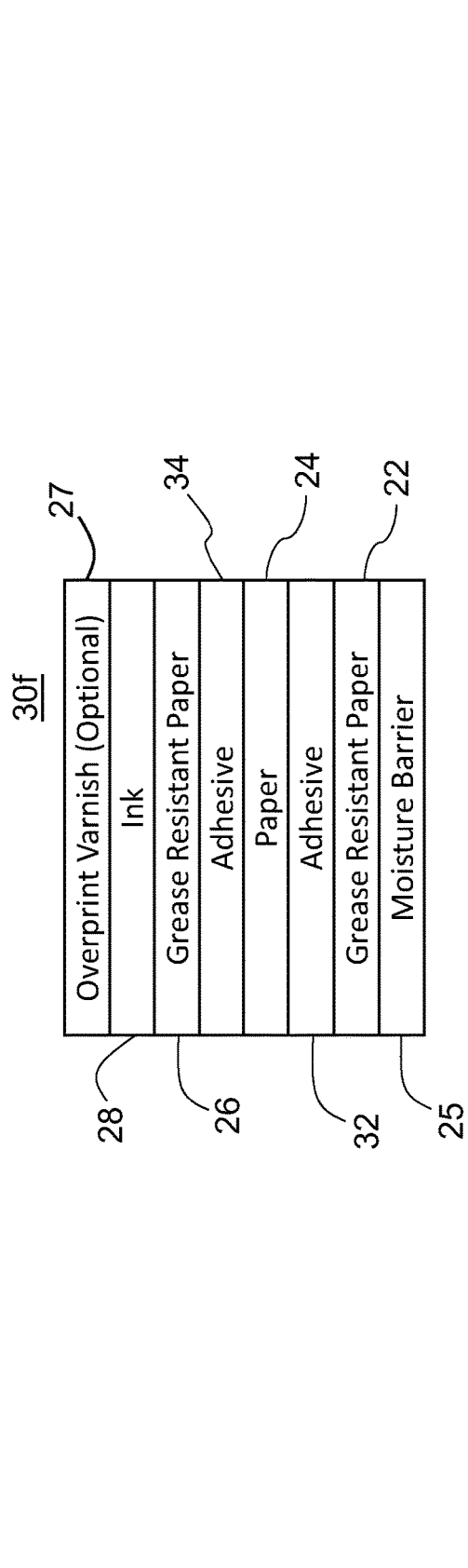
FIG. 3F

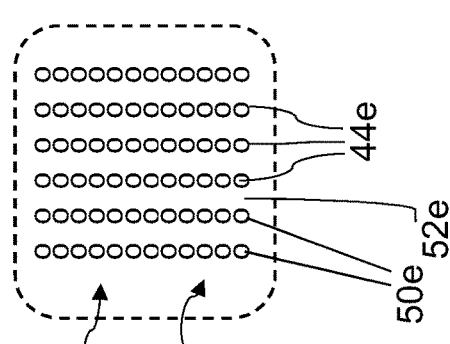
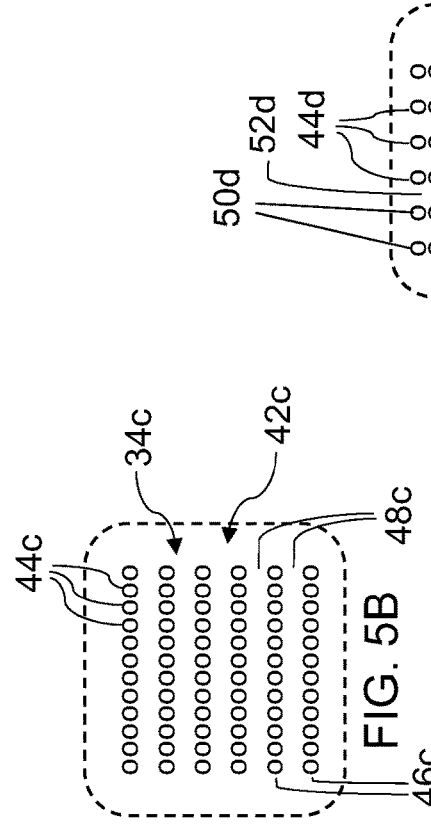
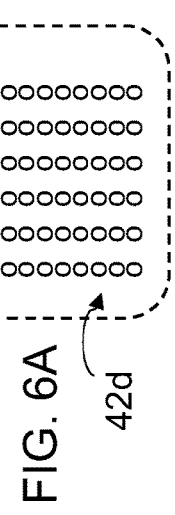
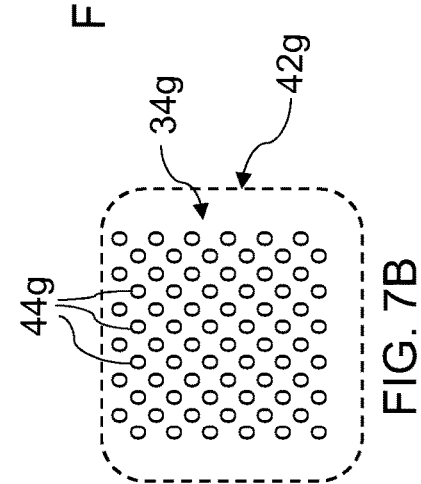
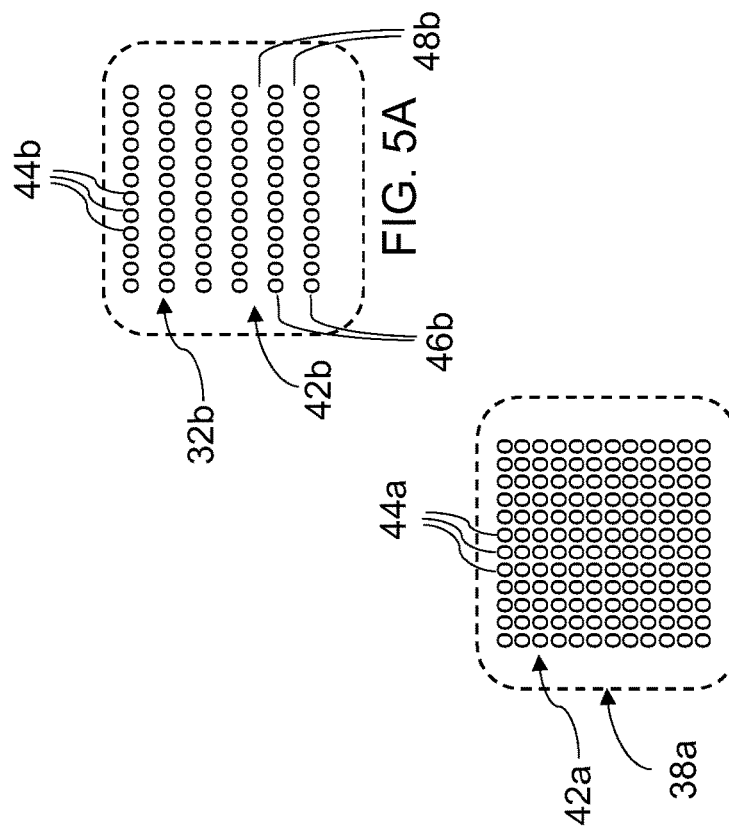
FIG. 4
FIG. 5A
FIG. 5B
FIG. 6A
FIG. 6B
FIG. 7A
FIG. 7B

MULTIWALL PAPER PACKAGING STRUCTURES

CROSS REFERENCE TO RELATED APPLICATION

This application claims the priority benefit of U.S. provisional application Ser. No. 63/248,753 filed Sep. 27, 2021. The aforementioned application is incorporated herein by reference in its entirety.

BACKGROUND

The present invention relates to multiwall paper packaging structures and, in particular, to multiwall paper packaging structures that are oil and/or grease resistant, recyclable, and free of fluorochemicals.

Packaging structure having high oil/grease resistance are used for packaging contents having a high oil or grease content in order to prevent oil and/or grease from bleeding through the packaging material and staining the outer portion of the bag. To provide oil/grease resistance and prevent edge wicking, multiwall paper packaging commonly utilizes paper that contain fluorochemicals, such as per- and polyfluoroalkyl substances (PFAS), which have been deemed hazardous. Such paper is generally used as the outer print ply in these packages. In current technologies, there is a polymer liner, such as an oriented polypropylene (OPP) liner that is in direct contact with the packaged product to prevent oil/grease from seeping out. However, the OPP liner renders the package non-recyclable in paper recycle streams.

However, no one has developed a structure where the PFAS chemicals and OPP liner have been removed while maintaining the excellent levels of oil/grease resistance and prevention of edge wicking. Specifically, no one has done this, and making the final package recyclable in a paper recycle stream. No one has used an alternated adhesive spot paste pattern to adhere three plies of paper together to reduce the stiffness of the package.

The present disclosure contemplates new and improved multiwall paper packaging structures and methods which overcome the above-referenced problems and others.

SUMMARY

In one aspect, a packaging article includes an outer paper ply, an intermediate paper ply, and an inner paper ply. A first adhesive layer is disposed between the inner paper ply and the intermediate paper ply, the first adhesive layer securing the inner paper ply to the intermediate paper ply. A second adhesive layer is disposed between the intermediate paper ply and the outer paper ply, the second adhesive layer securing the intermediate paper ply to the outer paper ply wherein the first adhesive layer and the second adhesive layer are coaligned. The outer paper ply, the intermediate paper ply, and the inner paper ply are adjoined to form a multiwall structure, wherein the first adhesive layer and the second adhesive layer are coaligned on the multiwall structure. The first adhesive layer comprises a first plurality of adhesive spots and the second adhesive layer comprises a second plurality of adhesive spots, wherein the adhesive spots of the first plurality of adhesive spots do not overlap with the adhesive spots of the second plurality of adhesive spots. In another aspect, a method of forming a packaging article is provided.

In another aspect, a method of forming a packaging article includes providing an outer web formed of a first paper material. An intermediate web formed of a second paper material and an inner web formed of a third paper material are also provided. A first adhesive layer is applied to a first predefined region on one of an outward facing surface of the inner web and an inward facing surface of the intermediate web. A second adhesive layer is applied to a second predefined region on one of an outward facing surface of the intermediate web and an inward facing surface of the outer web. The outer web, intermediate web, and inner web are glued to form a multiwall structure comprising an outer paper ply, an intermediate paper ply, and an inner paper ply, wherein the first predefined region and the second predefined region are coaligned. The first adhesive layer comprises a first plurality of adhesive spots and the second adhesive layer comprises a second plurality of adhesive spots, wherein the adhesive spots of the first plurality of adhesive spots do not overlap with the adhesive spots of the second plurality of adhesive spots.

In yet another aspect, a packaging article includes an outer paper ply, an intermediate paper ply, and an inner paper ply. A first adhesive layer is disposed between the inner paper ply and the intermediate paper ply, the first adhesive layer securing the inner paper ply to the intermediate paper ply. A second adhesive layer is disposed between the intermediate paper ply and the outer paper ply, the second adhesive layer securing the intermediate paper ply to the outer paper ply wherein the first adhesive layer and the second adhesive layer are coaligned. The outer paper ply, the intermediate paper ply, and the inner paper ply are adjoined to form a multiwall structure, wherein the packaging article is repulpable, recyclable, and grease resistant.

In another aspect, a method of forming a packaging article is provided.

One advantage of the present development resides in its excellent levels of oil and/or grease resistance and prevention of edge wicking.

Another advantage of the present development is found in that paper containing PFAS chemicals is not required.

Yet another advantage of the present development is that an OPP or other polymer liner is not required, thereby allowing the packaging structures herein to be recyclable in a paper recycle stream.

Still further advantages and benefits of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings, which are not necessarily to scale, are only for purposes of illustrating preferred embodiments and are not to be construed as limiting the invention.

FIG. 3D is a side cross-sectional view of an exemplary fourth embodiment multiwall packaging material.

FIG. 3E is a side cross-sectional view of an exemplary fifth embodiment multiwall packaging material.

FIG. 3F is a side cross-sectional view of an exemplary sixth embodiment multiwall packaging material.

FIG. 4 illustrates a conventional adhesive dot pattern for securing the paper plies in a conventional oil/grease resistant multiwall bag.

FIGS. 5A and 5B illustrate a first exemplary adhesive dot pattern for adhesively securing adjacent pairs of plies in the multiwall packaging structure of FIG. 1.

FIGS. 6A and 6B illustrate a second exemplary adhesive dot pattern for adhesively securing adjacent pairs of plies in the multiwall packaging structure of FIG. 1.

FIGS. 7A and 7B illustrate a third exemplary adhesive dot pattern for adhesively securing adjacent pairs of plies in the multiwall packaging structure of FIG. 1.

DETAILED DESCRIPTION OF THE PREFERRED EMBODIMENTS

The terms "a" or "an," as used herein, are defined as one or more than one. The term "another," as used herein, is defined as at least a second or more. The terms "including" and/or "having" as used herein, are defined as comprising (i.e., open transition). As used herein, the terms "joined," "coupled," "operatively coupled," and the like, are defined as indirectly or directly connected, unless specifically stated otherwise.

As used herein, "recyclable" may refer to a product that is eligible for acceptance into recycling programs, including curbside collection programs and recycling programs that use drop-off locations, including products that comply with one or more promulgated standards or guidelines for recyclability, and including materials that are sufficiently free of plastic materials, such as polyethylene, nylon, polypropylene, polyester, and others which would impede recyclability.

As used herein, "repulpable" may refer to a product that can be reused or remade into paper (e.g., at a paper mill), including products that comply with one or more promulgated standards or guidelines for repulpability, and including materials that are sufficiently free of plastic materials, such as polyethylene, nylon, polypropylene, polyester, and others which would impede repulpability.

All numbers herein are assumed to be modified by the term "about," unless stated otherwise. The recitation of numerical ranges by endpoints includes all numbers subsumed within that range (e.g., 1 to 5 includes, inter alia, 1, 1.5, 2, 2.75, 3, 3.80, 4, and 5).

Figure 1:
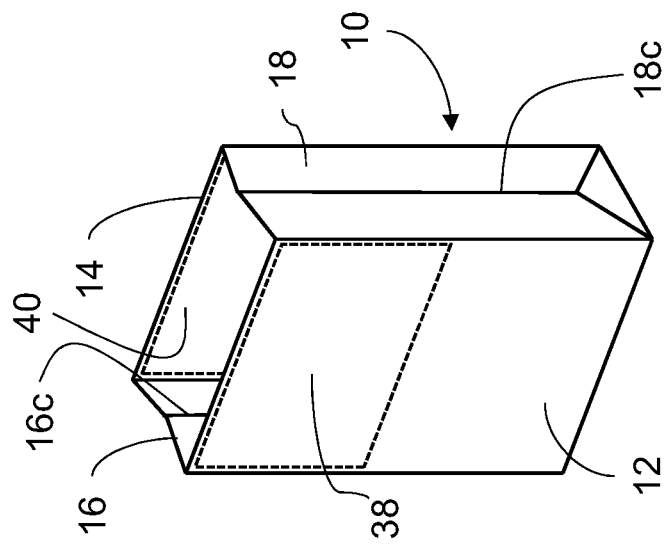
FIG. 1 is an isometric view of an exemplary three-ply paper multiwall paper packaging structure of the present invention.

Referring now to the drawings, FIG. 1 illustrates an exemplary multiwall packaging structure, which is a bag construction in the depicted embodiment, and is designated generally as reference numeral 10. The structure 10 includes a pair of generally opposing, rectangular front and back panels, 12 and 14 respectively. The front panel 12 and the back panel 14 are joined at opposite edges by gusseted side panels 16 and 18. The multiwall paper packaging structures herein are advantageously formed into packages (e.g. pouches, bags, overwraps) that protect consumable products (e.g. pet food, baking mixes, flour, sugar, and the like). Although the present invention is illustrated by way of reference to a preferred packaging structure 10 which comprises a self-opening sack (SOS), it will be recognized that the present development is amenable to other multiwall packaging structures, including pinch bottom type pouches or bags, e.g., pinch bottom open mouth (PBOM) bags, V-quad seal side gusseted bags or pouches, sewn open mouth (SOM) bags, pasted valve stepped end (PVSE) bags, satchel bottom open mouth (Webb pinch) bags, and others.

Figure 2:
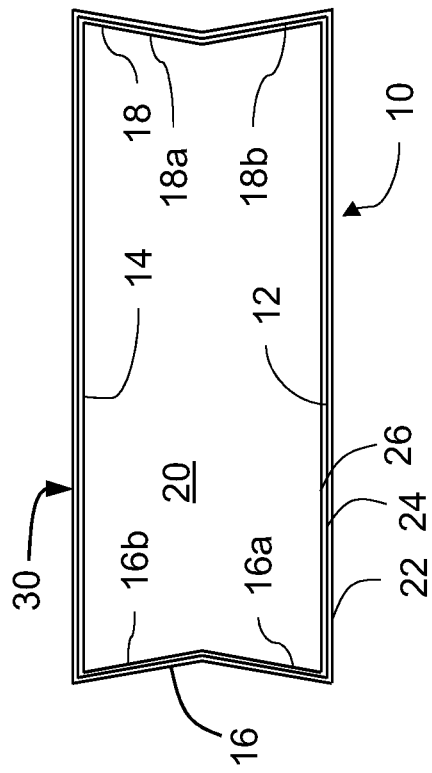
FIG. 2 is a cross-sectional view of the packaging structure appearing in FIG. 1.

Referring to FIG. 2 and continued reference to FIG. 1, the gusseted side panels 16 and 18 comprise first and second panel portions 16a, 16b and 18a, 18b, respectively. The panel portions 16a, 16b and 18a, 18b are joined along respective fold lines 16c and 18c. The folded lines 16c and 18c enable the gusseted side panels 16 and 18 to be folded inwardly with an accordion pleat. When the structure 10 is folded in a collapsed, flat configuration, the gusseted panels 16 and 18 are disposed between the front panel 12 and the back panel 14. The front panel 12, back panel 14, gusseted side panel 16, and gusseted side panel 18 are adhesively secured together to close and seal the bottom end 20 of the bag 10. The panels 12, 14, 16, and 18 of the bag 10 are constructed with a multiwall or multi-ply structure.

Figure 3A:
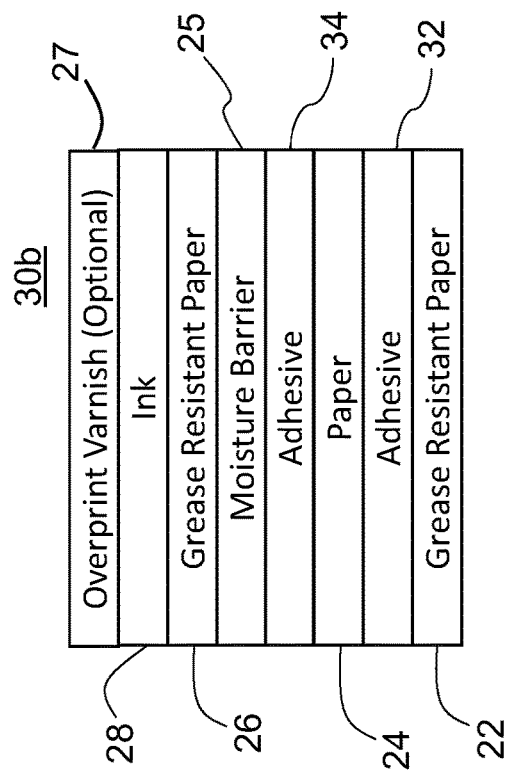
FIG. 3A is a side cross-sectional view of an exemplary first embodiment multiwall packaging material.

As shown in FIG. 3A, a multiwall structure 30a comprises an inner paper ply 22, an intermediate paper ply 24, and an outer paper ply 26. A first adhesive layer 32 is disposed intermediate the grease resistant paper layer 22 and the paper layer 24. A second adhesive layer 34 is disposed intermediate the paper layer 24 and the grease resistant paper layer 26. A printed ink layer 28 is provided on the outward or exterior facing surface of the outer paper ply 26 to provide text, pictorial, or other graphical indicia or representations to appear on the exterior of the package construction 10. An optional varnish layer 27 is applied over the ink layer 28.

FIGS. 3B-3F are particularly advantageous for packaging applications where the product to be packaged is subject to drying out, e.g., in low relative humidity environments and/or where is desired to minimize water uptake, e.g., in high relative humidity environments by reducing the water vapor transmission rate (WVTR) of the packaging structure. Although FIGS. 3B-3F illustrate packaging structures having a single moisture barrier layer 25, it will be recognized that other embodiments are contemplated having multiple moisture barrier layers 25.

Figure 3B:
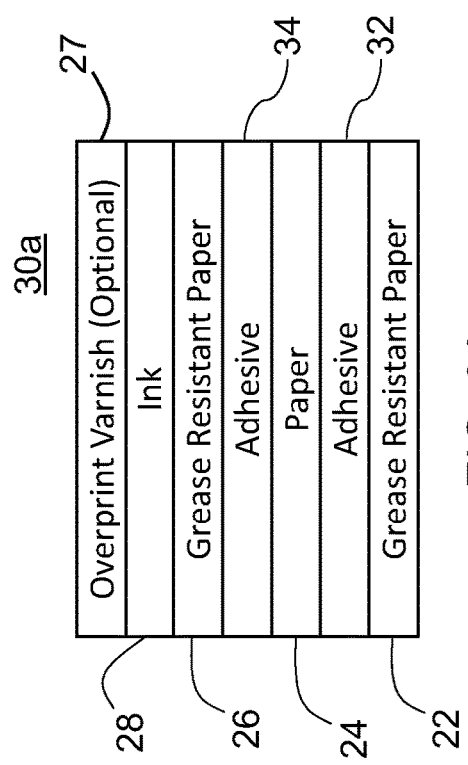
FIG. 3B is a side cross-sectional view of an exemplary second embodiment multiwall packaging material.

As shown in FIG. 3B, a multiwall structure 30b, which provides increased moisture resistance, comprises an inner paper ply 22, an intermediate paper ply 24, and an outer paper ply 26. A first adhesive layer 32 is disposed intermediate the grease resistant paper layer 22 and the paper layer 24. A second adhesive layer 34 is disposed intermediate the paper layer 24 and the grease resistant paper layer 26. A printed ink layer 28 is provided on the outward or exterior facing surface of the outer paper ply 26 to provide text, pictorial, or other graphical indicia or representations to appear on the exterior of the package construction 10. An optional varnish layer 27 is applied over the ink layer 28. A moisture barrier layer 25 is disposed on the interior facing surface of the grease resistant paper layer 26.

Figure 3C:
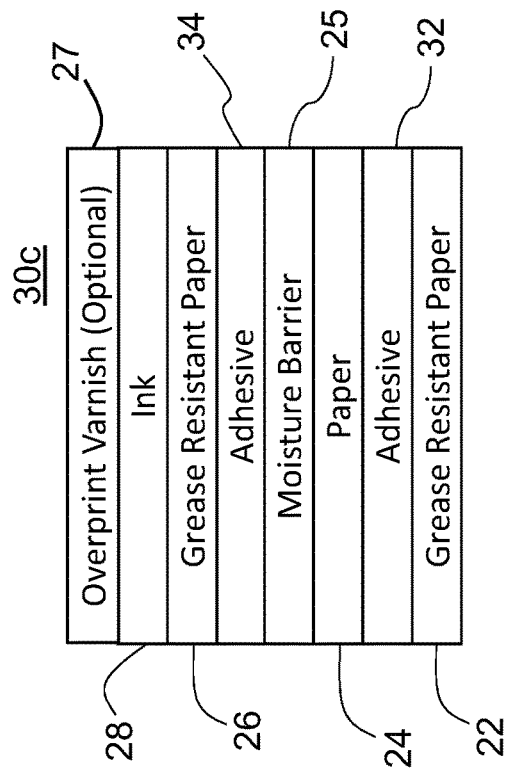
FIG. 3C is a side cross-sectional view of an exemplary third embodiment multiwall packaging material.

As shown in FIG. 3C, a multiwall structure 30c which provides increased moisture resistance, comprises an inner paper ply 22, an intermediate paper ply 24, and an outer paper ply 26. A first adhesive layer 32 is disposed intermediate the grease resistant paper layer 22 and the paper layer 24. A second adhesive layer 34 is disposed intermediate the paper layer 24 and the grease resistant paper layer 26. A printed ink layer 28 is provided on the outward or exterior facing surface of the outer paper ply 26 to provide text, pictorial, or other graphical indicia or representations to appear on the exterior of the package construction 10. An optional varnish layer 27 is applied over the ink layer 28. A moisture barrier layer 25 is disposed on the outward facing surface of the paper layer 24.

As shown in FIG. 3D, a multiwall structure 30d which provides increased moisture resistance, comprises an inner paper ply 22, an intermediate paper ply 24, and an outer paper ply 26. A first adhesive layer 32 is disposed intermediate the grease resistant paper layer 22 and the paper layer 24. A second adhesive layer 34 is disposed intermediate the paper layer 24 and the grease resistant paper layer 26. A printed ink layer 28 is provided on the outward or exterior facing surface of the outer paper ply 26 to provide text, pictorial, or other graphical indicia or representations to appear on the exterior of the package construction 10. An optional varnish layer 27 is applied over the ink layer 28. A moisture barrier layer 25 is disposed on the inward facing surface of the paper layer 24.

As shown in FIG. 3E, a multiwall structure 30e which provides increased moisture resistance, comprises an inner paper ply 22, an intermediate paper ply 24, and an outer paper ply 26. A first adhesive layer 32 is disposed intermediate the grease resistant paper layer 22 and the paper layer 24. A second adhesive layer 34 is disposed intermediate the paper layer 24 and the grease resistant paper layer 26. A printed ink layer 28 is provided on the outward or exterior facing surface of the outer paper ply 26 to provide text, pictorial, or other graphical indicia or representations to appear on the exterior of the package construction 10. An optional varnish layer 27 is applied over the ink layer 28. A moisture barrier layer 25 is disposed on the outward facing surface of the paper layer 22.

As shown in FIG. 3F, a multiwall structure 30f which provides increased moisture resistance, comprises an inner paper ply 22, an intermediate paper ply 24, and an outer paper ply 26. A first adhesive layer 32 is disposed intermediate the grease resistant paper layer 22 and the paper layer 24. A second adhesive layer 34 is disposed intermediate the paper layer 24 and the grease resistant paper layer 26. A printed ink layer 28 is provided on the outward or exterior facing surface of the outer paper ply 26 to provide text, pictorial, or other graphical indicia or representations to appear on the exterior of the package construction 10. An optional varnish layer 27 is applied over the ink layer 28. A moisture barrier layer 25 is disposed on the inward facing, i.e., product-contacting, surface of the paper layer 22. In embodiments, the structure 30f is advantageously used for packaging applications where product palatability is not an issue.

The inner paper ply 22 comprises a fluorochemical free paper. In embodiments, the inner paper ply 22 comprises a highly refined paper, e.g., similar to glassine paper, which imparts grease-resistance to the structure without fluorocarbon treatment. In such embodiments, the grease resistant properties of the ply 22 is the result of tight packing of the highly refined fibers of the sheet, thereby physically preventing the migration of grease into and through the ply 22. In embodiments, the inner paper ply 22 comprises a fluorochemical free paper which has a coating applied to enhance oil/grease resistance and edge wicking resistance. In certain embodiments, the inner paper ply 22 is a highly refined and calendared paper. In certain embodiments, the coating is a bio-based coating such as starches, sugar cane based coatings and the like. In certain embodiments, the inner paper ply 22 is an extensible paper to provide improved puncture resistance and tensile strength. In certain embodiments, the inner paper ply is a bleached Kraft paper or a natural Kraft paper. In certain embodiments, the inner paper ply is a commercially available grease resistant, PFAS-free paper, such as GREASE-GARD™ FLUOROFREE™ paper, which is available from Ahlstrom-Munksjö of Helsinki, Finland.

As an alternative to or in addition to the aforementioned oil/grease resistant coating layer, one or more oil and/or grease resistance additives may be added to the fibrous composition during the paper making process, for example, at levels up to about 2% by weight. Exemplary oil and/or grease resistance additives include, for example, oxidized polyethylenes, latex, SMA (styrene maleic anhydride), polyamide, waxes, alginate, proteins, carboxymethyl cellulose (CMC), hyrdoxymethyl cellulose (HMC), and so forth.

The outer paper ply 26, which may be the same or different as the inner paper ply 22, may be any of the fluorochemical free, oil and/or grease resistant papers as described above by way of reference to the inner paper ply 22. The outer paper ply 26 has an ink layer 28 applied on the exterior surface. The outer paper ply 26 is preferably a white or bleached paper to provide improved printing characteristics. The bleached paper also has a lower stiffness as compared to its natural Kraft/brown counterpart to allow for improved runability on filling machines. In certain embodiments, the basis weight of the paper plies 22, 26 is in the range from 22.5 #/ream to 40 #/ream, although other basis weights are contemplated.

The ink layer 28 is a surface printed ink layer. In certain embodiments, the ink layer 28 is applied using solventless ink system, such as energy-cured inks (e.g., electron beam cured inks or UV radiation cured inks). In certain embodiments, the ink layer 28 is applied using water-based inks. In certain embodiments, an optional varnish or over lacquer layer 27 is applied to the ink layer 28 to protect the ink(s) from scuffs and rubbing off. In embodiments, the overprint varnish or lacquer also increases the strength of the bag, enhances oil and grease resistance, and/or improves moisture barrier properties of the bag.

In certain embodiments, such as packaging formed of the structure 30a wherein the bag construction 10 lacks a polypropylene or other polymer layer to act as a barrier not only to oil and grease from the contents of the bag 10 permeating the plies from the interior of the bag and staining the outer layer 26, but also to external contaminates passing into the interior of the bag 10, it is advantageous to use solventless ink systems or water-based inks to prevent residual, unevaporated ink solvents from passing into the interior of the bag 10. For example, when utilizing the packaging constructions 10 herein for pet food applications, it has been found that when solvent free ink systems such as energy cured inks and water-based inks are used, there are minimal effects on palatability (PAL) testing with animals as compared to conventional multiwall pet food bag constructions having a polymer oil/grease barrier liner in the interior surface thereof.

The printing ink layer 28 can be applied to the outer surface of the outer paper ply 22 via any conventional printing method as would be understood by persons skilled in the art, including without limitation, using a rotogravure printing apparatus, flexographic printing apparatus, or using an offset printing apparatus.

The intermediate paper ply 24 may be a bleached or unbleached paper layer which contains no fluorochemical materials. In certain embodiments, the intermediate paper ply 24 is an extensible paper. In certain embodiments, the intermediate paper ply 24 is a Natural Kraft paper. In certain embodiments, the intermediate paper ply 24 is a bleached Kraft paper, which provides an improved printing appearance on the outer surface, although unbleached Kraft paper is also contemplated.

In the manufacture of the packaging structure 10, each of the paper plies 22, 24, and 26 are separate webs which are glued together to form a single, multi-ply web 30. The inner paper ply 22 is glued to the intermediate paper ply 24 using a first adhesive layer 32, which is disposed in between the outward facing surface of the inner paper ply 22 and the inward facing surface of the intermediate paper ply 24. The intermediate paper ply 24 is glued to the outer paper ply 26 using a second adhesive layer 34, which is disposed in between the outward facing surface of the intermediate paper ply 24 and the inward facing surface of the outer paper ply 26.

The first adhesive layer 32 is applied as a plurality of adhesive spots 36a forming a first pattern and the second adhesive 34 layer is applied as a plurality of adhesive spots 36b forming a second pattern. In certain embodiments, the adhesive layers 32, 34, are not applied over the entire area of the web 30 or over the entire area of a form or blank to be folded and glued to form the bag 10, but rather, the adhesive patterns 32 and 34 are applied within a designated adhesive area or region 38 on the front panel 12 and within a designated adhesive area or region 40 on the rear panel 12. In this manner, the amount of adhesive used to glue the paper plies 22, 24, and 26 is reduced.

The moisture barrier layer 25 is a coating film layer having an adequate thickness and density which is effective to provide a low permeability of water vapor and thereby reduce the rate of water transmission through the multilayer structure. In embodiments, the moisture barrier layer comprises a polyolefin such as polyethylene, polypropylene, and blends thereof. Exemplary moisture barrier layer compositions include high density polyethylene (HDPE), medium density polyethylene (MDPE), low density polyethylene (LDPE), linear polyethylenes such as linear low density polyethylene (LLDPE), polypropylene (PP), oriented polypropylene (OPP), and biaxially oriented polypropylene (BOPP). The moisture barrier layer 25 may be brought onto the surface of the paper 22, 24, or 26 via lamination, extrusion coating, or the like.

In embodiments, the moisture barrier layer 25 is a dried polymer dispersion, wherein the moisture-resistant coating 25 is applied as a coating in the form of an aqueous or non-aqueous solvent-based polymer dispersion and then dried. Exemplary solvents include water, ethanol, and isopropanol. Exemplary polymers include polyacrylates, latex, waxes (e.g., animal waxes, vegetable waxes, mineral waxes, and petroleum waxes), polystryenes, and polyolefins (e.g., polyethylenes and polypropylenes). The aqueous or non-aqueous solvent-based polymer dispersion is applied by a suitable coating technique, such as roll coating, roll-to-roll coating, various types of gravure coating, flexographic coating, bar coating, doctor blade coating, comma coating, spraying, or brush coating. The solvent is removed using heat, vacuum, forced hot air, drying oven, and the like.

Referring now to FIG. 4, there appears an exemplary adhesive region 38a having glue spots 44a applied in a conventional grid pattern 42a as may be utilized in a typical multiwall bag having single adhesive layer, such as multi-wall bag comprising a polymer inner liner which is fully laminated to an intermediate paper layer and which, in turn, is adhesively laminated to an outer paper layer. In the illustrated embodiment, the adhesive dot grid pattern 42a comprises 12 horizontal (in the orientation shown in FIG. 4) rows and 12 vertical (in the orientation shown in FIG. 4) columns.

However, in the bag construction 10, there are two overlapping and coextensive adhesive layers 32, 34 in the adhesive region 38 on the front panel 12 are well as two over lapping and coextensive adhesive layers 32, 34 in the adhesive region 40 on the rear panel 14. In order to reduce the stiffness caused by the two overlapping adhesive layers in each of the regions 38, 40, the present development, the adhesive layer 32 utilizes a first glue spot pattern and the adhesive layer 34 utilizes a second glue spot pattern, wherein the glue spots of the adhesive layer 32 do not overlap with or overlie the glue spots of the adhesive layer 34.

In certain embodiments, the first adhesive layer 32 in the region 38 utilizes a glue spot pattern comprising a first plurality of glue spots and a first plurality of interstices disposed between the glue spots, and the second adhesive layer 34 utilizes a glue spot pattern comprising a second plurality of glue spots and a second plurality of interstices disposed between the glue spots, wherein the glue spots in the first adhesive layer 32 are aligned with the interstices in the second adhesive layer 34 and the glue spots in the second adhesive layer 34 are aligned with the interstices in the first adhesive layer 32.

Since the glue spots within the first adhesive layer 32 are aligned with the interstices within the second adhesive layer 34 and vice versa, there will be no point within the adhesive region 38 where glue spots in the first adhesive layer 32 overlap with glue spots in the second adhesive layer 34, thereby reducing the stiffness of the bag construction 10.

Likewise, the first adhesive layer 32 in the region 40 utilizes a glue spot pattern comprising a first plurality of glue spots and a first plurality of interstices disposed between the glue spots, and the second adhesive layer 34 utilizes a glue spot pattern comprising a second plurality of glue spots and a second plurality of interstices disposed between the glue spots, wherein the glue spots in the first adhesive layer 32 are aligned with the interstices in the second adhesive layer 34 and the glue spots in the second adhesive layer 34 are aligned with the interstices in the first adhesive layer 32.

Since the glue spots within the first adhesive layer 32 are aligned with the interstices within the second adhesive layer 34 and vice versa, there will be no point within the adhesive region 40 where glue spots in the first adhesive layer 32 overlap with glue spots in the second adhesive layer 34, thereby reducing the stiffness of the bag construction 10.

Referring now to FIGS. 5A and 5B, FIG. 5A illustrates an exemplary embodiment adhesive layer 32b applied in an adhesive spot pattern 42b, which is disposed within the glue region 38 (see FIG. 1). The pattern 42b comprises a plurality of glue spots 44b arranged in horizontal rows 46b, which alternate with interstitial rows 48b which are void of glue spots. FIG. 5B illustrates an adhesive layer 34c which is applied in an adhesive spot pattern 42c, likewise disposed within the glue region 38 (see FIG. 1). The pattern 42c comprises a plurality of glue spots 44c arranged in horizontal rows 46c which alternate with interstitial rows 48c, which are void of glue spots.

The patterns 42b and 42c are complementary in that the rows 46b are offset with respect to the rows 46c such that the rows 46b are aligned with the interstitial rows 48c and the rows 46c are aligned with the interstitial rows 48b, such that the glue spots 44b of the adhesive layer 32b do not overlap with or overlie the glue spots 44c of the adhesive layer 34b.

The glue spot patterns appearing in FIGS. 5A and 5B are equally suitable for the adhesive region 40 of the rear panel 14.

Referring now to FIGS. 6A and 6B, FIG. 6A illustrates another exemplary embodiment adhesive layer 32d applied in an adhesive spot pattern 42d, which is disposed within the glue region 38 (see FIG. 1). The pattern 42d comprises a plurality of glue spots 44d arranged in vertical columns 50d, which alternate with interstitial columns 52d, which are void of glue spots. FIG. 6B illustrates an adhesive layer 34e which is applied in an adhesive spot pattern 42e, likewise disposed within the glue region 38 (see FIG. 1). The pattern 42e comprises a plurality of glue spots 44e arranged in vertical rows 50e which alternate with interstitial columns 52e, which are void of glue spots.

The patterns 42d and 42e are complementary in that the columns 50d are offset with respect to the columns 52e such that the columns 50d are aligned with the interstitial columns 52e and the columns 50e are aligned with the interstitial columns 52d, such that the glue spots 44d of the adhesive layer 32d do not overlap with or overlie the glue spots 44e of the adhesive layer 34e.

The glue spot patterns appearing in FIGS. 6A and 6B are equally suitable for the adhesive region 40 of the rear panel 14.

Referring now to FIGS. 7A and 7B, FIG. 7A illustrates another exemplary embodiment adhesive layer 32f applied in an adhesive spot pattern 42f, which is disposed within the glue region 38 (see FIG. 1). The pattern 42f comprises a plurality of glue spots 44f arranged in checkerboard pattern of alternating glue spots 44f and interstices disposed between adjacent glue spots 44f. FIG. 7B illustrates an adhesive layer 34g which is applied in an adhesive spot pattern 42g, likewise disposed within the glue region 38 (see FIG. 1). The pattern 42g comprises a plurality of glue spots 44g arranged in checkerboard pattern of alternating glue spots 44g and interstices disposed between adjacent glue spots 44g.

The patterns 42f and 42g are complementary in that the glue spots 44f are located on the "white" locations on the checkerboard and the glue spots 44g are located on the "black" locations on the checkerboard, such that the glue spots 44f of the adhesive layer 32f do not overlap with or overlie the glue spots 44g of the adhesive layer 34g.

The glue spot patterns appearing in FIGS. 7A and 7B are equally suitable for the adhesive region 40 of the rear panel 14.

In certain embodiments, the first and second adhesive layers, which may be the same adhesive or different adhesives, may comprise any suitable adhesive for gluing the paper plies, including without limitation, water-based adhesives, pressure sensitive adhesives, acrylic-based adhesives, styrene copolymer adhesives, rubber-based adhesives, and the like. In certain embodiments, the adhesives utilized are water-based adhesives that have co-polymer chemistries as would be understood by persons skilled in the art. In certain embodiments, pressure sensitive adhesives can advantageously be used to reduce the stiffness throughout the bag, but run the risk of adversely affecting the palatability testing for certain applications.

In the manufacture of the bag construction 10, after the plies 22, 24, and 26 are glued to form the multi-ply web 30 which can be printed, cut, and glued or sealed to form the bag 10. In certain embodiments, the bag 10 is formed using a hot melt adhesive although other adhesives can be used as well, including the adhesives described above for gluing the paper plies.

The 3M kit is a standard method for testing oil or grease resistance of paper/film substrates. There are 12 levels of aggressive oils/greases, with 12 being the most aggressive, that are applied to a substrate to determine the oil/grease resistance. The paper plies utilized in the present packaging structure are able to withstand and resist the oil/grease of all 12 oils, receiving a Kit level of 12, as shown in Table 1.

TABLE 1

| Paper Substrate | Kit Level |
| --- | --- |
| 40# Natural Kraft Converting | 3 |
| 40# Bleached Paper | 3 |
| Clay-Coated Bleached Paper | 4 |
| Clay-Coated Bleached Fluorochemical Treated Paper | 11 |
| Oil/Grease Resistant Bleached Paper | 12 |
| Oil/Grease Resistant Natural Kraft Paper | 12 |

Edge wick testing involves the bags in accordance with this disclosure being filled with greasy/fatty pet food, and placed in an environmental chamber for accelerated testing. The bags are placed on a brown Kraft paper in the oven, to help show if oil or grease seeps through the bags, and into the brown paper. The chamber conditions are set at ambient humidity and a temperature of 140° F. (60° C.). The bags are tested for minimum of 24 hours up to 72 hours, and then evaluated to see if there is any visible oil/grease stains on the outer paper ply of the bag. The bags herein pass edge wick testing, even with aggressive combination of fat/oil/fatty acid.

The invention has been described with reference to the preferred embodiment. Modifications and alterations will occur to others upon a reading and understanding of the preceding detailed description. It is intended that the invention be construed as including all such modifications and alterations insofar as they come within the scope of the appended claims or the equivalents thereof.

What is claimed is:

1. A packaging article comprising:
    a web of material comprising an outer paper ply, an intermediate paper ply, and an inner paper ply, wherein the outer paper ply, intermediate paper ply, and inner paper ply each comprise a planar sheet of material having opposing flat major surfaces;
    a first adhesive layer disposed between the inner paper ply and the intermediate paper ply, the first adhesive layer securing the inner paper ply to the intermediate paper ply;
    a second adhesive layer disposed between the intermediate paper ply and the outer paper ply, the second adhesive layer securing the intermediate paper ply to the outer paper ply wherein the first adhesive layer and the second adhesive layer are coaligned;
    wherein the outer paper ply, the intermediate paper ply, and the inner paper ply are adjoined to form a multiwall structure;
    wherein the first adhesive layer and the second adhesive layer are coaligned on the multiwall structure;
    wherein the first adhesive layer comprises a first plurality of adhesive spots and the second adhesive layer comprises a second plurality of adhesive spots, wherein the adhesive spots of the first plurality of adhesive spots do not overlap with the adhesive spots of the second plurality of adhesive spots;
    wherein the first plurality of adhesive spots defines a grid pattern comprising a plurality of rows and a plurality of columns; and wherein the second plurality of adhesive spots defines a grid pattern comprising a plurality of rows and a plurality of columns.

2. The packaging article of claim 1, further comprising a moisture barrier layer disposed on at least one surface of one or more of the outer paper ply, the intermediate paper ply, and the inner paper ply.

3. The packaging article as recited in claim 1, wherein each of the inner paper ply and the outer paper ply, which may be the same or different, is selected from the group consisting of:
a highly refined paper substrate which is inherently grease resistant; and
a paper substrate having one or both of an oil and/or grease resistant coating and an oil and/or grease resistance additive blended into the paper.

4. The packaging article as recited in claim 1, wherein each of the inner paper ply, intermediate paper ply, and the outer paper ply do not contain any fluorochemicals.

5. The packaging article as recited in claim 1, further comprising:
a printed ink layer disposed on an outward facing surface of the outer paper ply.

6. The packaging article as recited in claim 5, wherein the printed ink layer is selected from the group consisting of a solvent free ink, energy cured ink, water-based ink, and a solvent-based ink.

7. The packaging article as recited in claim 5, wherein the printed ink layer is selected from the group consisting of an electron beam cured ink and a UV cured ink.

8. The packaging article as recited in claim 5, further comprising an overprint varnish or lacquer disposed on the printed ink layer.

9. The packaging article as recited in claim 1, wherein the plurality of rows of the grid patterns of the first and second plurality of adhesive spots extend in a transverse direction which is perpendicular to a machine direction, and further wherein the plurality of rows of the grid pattern of the first plurality of adhesive spots are offset in the machine direction with respect to the plurality of rows of the grid pattern of the second plurality of adhesive spots.

10. The packaging article as recited in claim 1, wherein the plurality of columns of the grid patterns of the first and second plurality of adhesive spots extends in a machine direction which is perpendicular to a transverse direction, and further wherein the plurality of columns of the grid pattern of the first plurality of adhesive spots are offset in the transverse direction with respect to the plurality of columns of the grid pattern of the second plurality of adhesive spots.

11. The packaging article as recited in claim 1, wherein each of the first plurality of adhesive spots and the second plurality of adhesive spots comprise an alternating pattern of adhesive spots and interstices, and further wherein and the adhesive spots of the first plurality of adhesive spots are aligned with the interstices of the second plurality of adhesive spots.

12. The packaging article as recited in claim 1, wherein the packaging article is a bag.

13. The packaging article as recited in claim 12, wherein the bag has a front panel, a back panel, and opposing side panels joining the front and back panels.

14. The packaging article as recited in claim 13, wherein the opposing side panels are gusseted.

15. The packaging article as recited in claim 13, wherein the bag is closed at a first end and open at a second end opposite the first end.

16. The packaging article as recited in claim 1, wherein the packaging article is selected from the group consisting of a bag, pouch, overwrap, self-opening sack (SOS) bag, pinch bottom pouch, pinch bottom open mouth (PBOM) bag, and quad seal side gusseted bag.

17. The packaging article as recited in claim 1, wherein the packaging article is a pet food bag.

18. The packaging article as recited in claim 17, wherein the multiwall structure is configured to resist bleed through of oil and/or grease from within the packaging article.

19. The packaging article as recited in claim 1, wherein said multiwall structure includes:
a pair of substantially rectangular, opposing front and back panels, each having top and bottom ends and opposing side edges extending between the top and bottom ends;
a pair of opposing side panels joining the opposing side edges of the front and back panels; and
a closure securing the bottom ends of the front and back panels and the pair of side panels to close one end of the bag.

20. The packaging article as recited in claim 19, wherein the first and second adhesive layers are disposed on one or both of the front panel and the back panel.

21. The packaging article as recited in claim 19, wherein each of the side panels has a longitudinal accordion pleat defining longitudinal gusset fold therein.

22. The packaging article as recited in claim 19, wherein the packaging article is a pet food bag.

23. A paper-based packaging article, comprising:
a web of material comprising an outer paper ply, an intermediate paper ply, and an inner paper ply, wherein the outer paper ply, intermediate paper ply, and inner paper ply each comprise a planar sheet of material having opposing flat major surfaces;
a first adhesive layer disposed between the inner paper ply and the intermediate paper ply, the first adhesive layer securing the inner paper ply to the intermediate paper ply;
a second adhesive layer disposed between the intermediate paper ply and the outer paper ply, the second adhesive layer securing the intermediate paper ply to the outer paper ply;
wherein the outer paper ply, the intermediate paper ply, and the inner paper ply are adjoined to form a multiwall structure;
wherein the packaging article is repulpable, recyclable, and grease resistant;
wherein the first adhesive layer and the second adhesive layer are coaligned on the multiwall structure;
wherein the first adhesive layer comprises a first plurality of adhesive spots and the second adhesive layer comprises a second plurality of adhesive spots;
wherein the adhesive spots of the first plurality of adhesive spots do not overlap with the adhesive spots of the second plurality of adhesive spots;
wherein the first plurality of adhesive spots defines a grid pattern comprising a plurality of rows and a plurality of columns; and
wherein the second plurality of adhesive spots defines a grid pattern comprising a plurality of rows and a plurality of columns.

24. A method of forming a packaging article, comprising the steps of:
providing an outer web formed of a first paper material;
providing an intermediate web formed of a second paper material;

providing an inner web formed of a third paper material;
said outer paper ply, intermediate paper ply, and inner paper ply each comprising a planar sheet of material having opposing flat major surfaces;
applying a first adhesive layer to a first predefined region on one of an outward facing surface of the inner web and an inward facing surface of the intermediate web;
applying a second adhesive layer to a second predefined region on one of an outward facing surface of the intermediate web and an inward facing surface of the outer web;
gluing the outer web, the intermediate web, and the inner web to form a multiwall structure comprising an outer paper ply, an intermediate paper ply, and an inner paper ply, wherein the first predefined region and the second predefined region are coaligned;
wherein the first adhesive layer comprises a first plurality of adhesive spots and the second adhesive layer comprises a second plurality of adhesive spots, wherein the adhesive spots of the first plurality of adhesive spots do not overlap with the adhesive spots of the second plurality of adhesive spots;
wherein the first plurality of adhesive spots defines a grid pattern comprising a plurality of rows and a plurality of columns; and
wherein the second plurality of adhesive spots defines a grid pattern comprising a plurality of rows and a plurality of columns.

25. The method of claim 24, further comprising:
folding the multiwall structure to form a pair of substantially rectangular, opposing front and back panels, each having top and bottom ends and opposing side edges extending between the top and bottom ends and a pair of opposing side panels joining the opposing side edges of the front and back panels; and
securing the bottom ends of the front and back panels and the pair of side panels to close one end of the bag.

* * * * *